July 3, 1956

F. X. VELTEN ET AL 2,753,039

CONVEYOR CONSTRUCTION

Filed Jan. 26, 1954

INVENTORS
Frank X. Velten
W. Clark Pulver

BY

Smith, Olsen, Baird & Gulbrandsen
Attys.

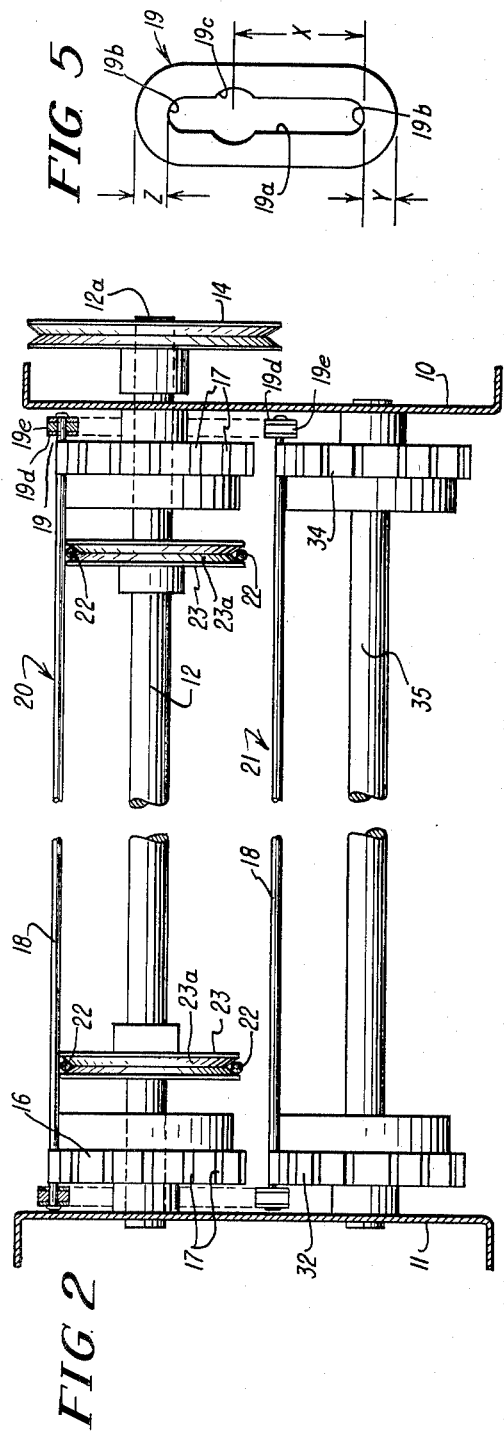

# United States Patent Office 2,753,039
Patented July 3, 1956

2,753,039
CONVEYOR CONSTRUCTION

Frank X. Velten and Willis Clark Pulver, Cook County, Ill., assignors to Velten & Pulver Inc., Chicago Ridge, Ill., a corporation of Illinois Application January 26, 1954, Serial No. 406,284

5 Claims. (Cl. 198—195)

This invention pertains to conveyors and more specifically to a conveyor of the endless-belt type particularly suitable for use in food processing plants, such as in bakeries and the like, wherein a high degree of sanitation must be maintained.

Inasmuch as the belt employed in a conveyor of the endless-belt type must be flexible in order that its direction of travel may be reversed at the opposite ends of the conveyor, its is necessary to provide some means for supporting the load-bearing portion of the belt to prevent excessive sagging when substantial loads are placed thereon. Heretofore, when the belt has been fabricated of rubber or the like and has been flexible transversely as well as longitudinally, it has been the practice to support the belt intermediate the ends of the conveyor by means of a plurality of stationary rollers or by means of a stationary table-like plate over which the belt has been moved in a sliding motion. On the other hand, when the belt has been of a type that is flexible longitudinally but substantially rigid transversely, it has been the practice to support the belt by means of stationary rails over which the belt has been moved in a sliding motion much like that when a table-like plate is employed under the belt. These previously known conveyors have been widely used in a great variety of industries but their employment in food processing plants has not been entirely satisfactory for the reason that they, by the very nature of their constructions, have been replete with parts upon which crumbs, food particles and dirt have tended to collect. A solid web-type belt, for example, will tend to collect dirt and crumbs thereon regardless of the manner in which it is supported. Although such belts may be brushed to remove crumbs and the like, they can not ordinarily be thoroughly cleaned or sterilized. Roller type supports and table-like plates or rails also collect dirt. The use of table-like plates or rails for supporting the conveyor belts furthermore has resulted in frictional losses that have reduced the efficiency of the conveyors and has limited the useful life of the various parts.

One of the important objects of the present invention is to provide a sanitary and easily cleaned conveyor of the endless-belt type having no horizontal planar surface of any appreciable size either on the belt or immediately adjacent thereto upon which dirt or food particles may collect. Another object of the invention is to provide an improved endless conveyor having means for supporting the load bearing flight of the conveyor, the supporting means being driven lineally at substantially the same speed as the conveyor belt, thereby eliminating substantially all friction between the two. Still another object of the invention is to provide in a conveyor of this character means by which the conveyor belt may be quickly assembled and disassembled and the parts thereof replaced in a minimum of time.

Briefly stated, the conveyor of the present invention, in its preferred form, includes an endless conveyor belt consisting essentially of a plurality of transverse parallel rods spaced apart longitudinally of the conveyor and interconnected at their adjacent end portions by a plurality of identical link elements so constructed and arranged that the conveyor belt may conveniently be separated at any point for disassembly or replacement of the links or rods. The rods are preferably circular in cross-section and are rotatable in their interconnecting links. The rods of the load-bearing flight of the conveyor belt rests freely upon and are supported by a pair of taut endless cables which extend from one end of the conveyor to the other and are driven lineally simultaneously with the conveyor belt and in the same direction as the conveyor belt. Thus, there are no parts on the conveyor belt or on its supporting means of a character such as would collect or retain crumbs and dirt, and there is little or no friction between the belt and its supporting means.

These and numerous other objects and advantages of the present invention will be apparent from the following detailed description of the preferred embodiment thereof, taken with the accompanying drawings wherein:

Fig. 2 is a vertical, transverse, cross-sectional view of the conveyor;

Fig. 3 is an enlarged fragmentary plan view of the ends of the transverse rod members of the conveyor, showing the manner in which the end portions of the rods are linked together;

Fig. 4 is a fragmentary elevation showing the ends of the transverse rod members and the links thereon;

Fig. 5 is a plan view of one of the links; and

Fig. 6 is a fragmentary elevation of the ends of the transverse rods showing the manner in which the rods and links are moved in order to assemble or disassemble the endless conveyor belt.

Figure 1:
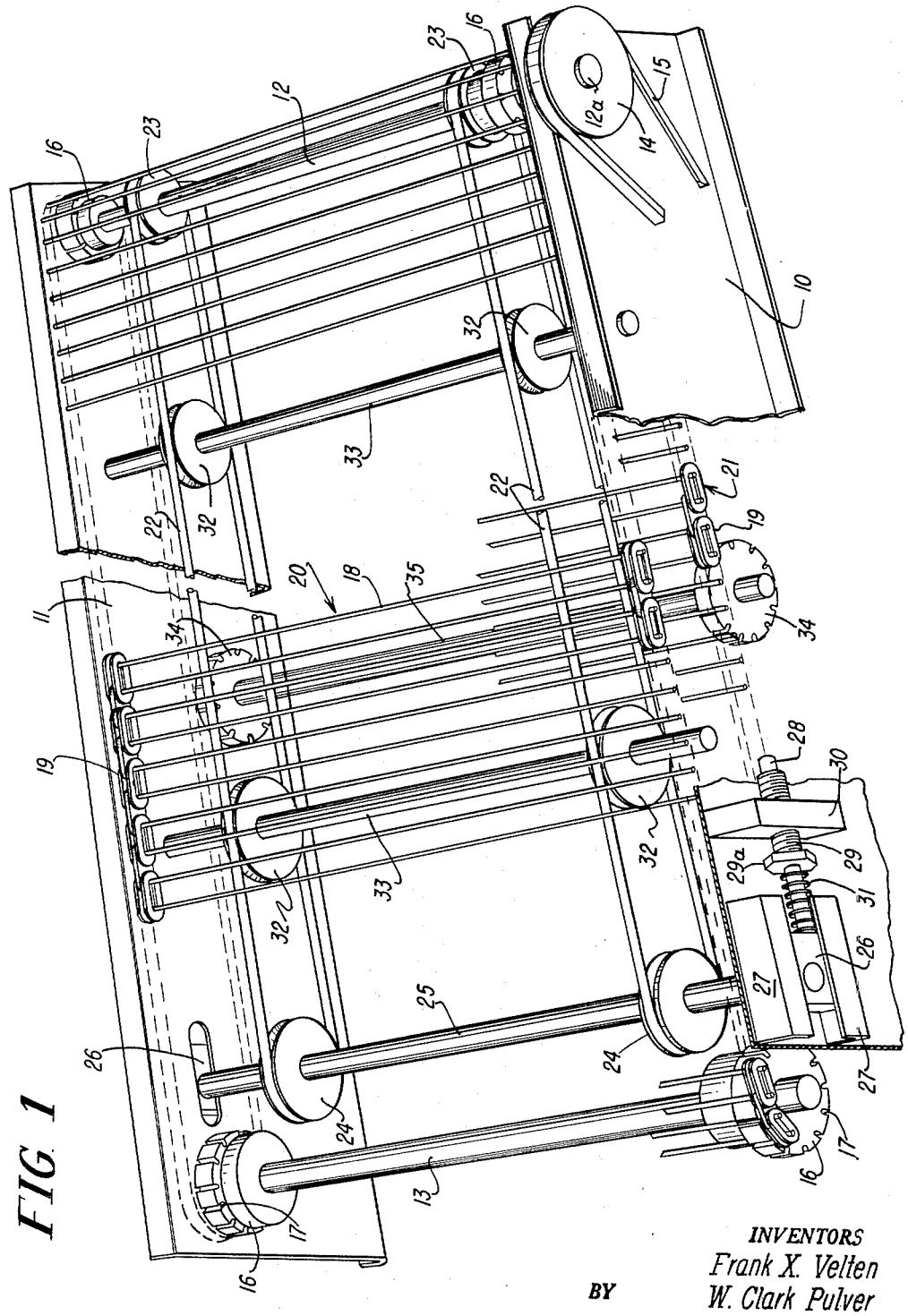
Fig. 1 is a perspective view of a conveyor incorporating the invention, parts of the frame for the conveyor being cut away for purposes of better illustration.

The embodiment of the invention illustrated in the drawings includes a frame consisting of two rigid longitudinal side members 10 and 11 which may be supported in parallel position in any suitable manner, such as by a leg type framework or the like, not shown. At opposite ends of the side members 10 and 11 there are a pair of shafts 12 and 13 extending between the two side members and journaled therein in suitable bearings. The shaft 13 is an idler shaft, while the shaft 12 is a driven shaft, one of its ends 12a extending through the frame member 10 and having a pulley 14 affixed thereto. The pulley 14 may be of the V-belt type and may be driven by a belt 15 connected to a source of power, not shown. A pair of sprockets 16 are fixed to each of the shafts 12 and 13 adjacent the inner surface of the side members 10 and 11 respectively. These sprockets may be fabricated of metal or fiber and each has provided in its periphery a plurality of evenly spaced transverse slots 17.

The conveyor belt comprises a plurality of evenly spaced cylindrical transverse rods 18 linked together at their adjacent end portions by links 19 to form an endless conveyor belt having a load-bearing flight, designated generally by the numeral 20, and a return flight 21. Each of the transverse rods 18 has bearing portions 18a formed thereon adjacent its opposite ends, the diameter of the bearing portions being less than the diameter of the extremities 18b of the rods 18, as best seen in Fig. 3. All of the links 19 may be of the same general configuration and may have the same length and width. Each link is provided with a longitudinal slot 19a having rounded ends 19b conforming substantially to the radial curvature of the bearing portions 18a of the rods 18. Each of the links also has an enlargement 19c in the longitudinal slot 19a, the edges of the enlargement being arc-shaped and having a radius slightly larger than that of the extremities 18b of the rods 18 so that the extremities of the rods may be freely passed through the enlargements 19c of the slots 19a.

The rods 18 are linked together at their bearing portions 18a in the manner best illustrated in Figs. 3 and 4. Pairs of rods 18 at their adjacent end portions are interconnected by a pair of laterally spaced links 19d, and the pairs of rods in turn are linked together by single flight links 19e having the same configuration as the links 19d but being of a somewhat greater thickness, the ends of the links 19e being disposed between the ends of adjacent pairs of links 19d to form an endless chain, with each bearing portion 18a of each rod 18 carrying three links, as shown in Fig. 3.

The endless conveyor belt, consisting of the transverse rods 18 and the links 19d and 19e, engages the slotted sprockets 16 at its opposite ends as shown in Fig. 1, the transverse rods 18 being successively received in the slots 17 in the sprockets so that the belt is driven lineally when the shaft 12 is rotatably driven by the pulley 14. Suitable slack take-up means for the conveyor belt may be provided in conjunction with the bearings for the idler shaft 13. This slack take-up means may be of any conventional construction and therefore has not been illustrated in the drawings.

The conveyor as described above is supported in its load-bearing flight 20 by a pair of parallel, taut, endless cables 22. These cables, at their respective ends, extend around drive pulleys 23 fixed upon the conveyor drive shaft 12 and around a pair of pulleys 24 on an idler shaft 25 that is journaled at its opposite ends in block bearings 26 slidably mounted between vertically spaced horizontal rails 27 that are respectively fixed upon the outer surfaces of the side frame members 10 and 11 adjacent the idler shaft 13. The block bearings 26 are spring-pressed in a direction that will take up any slack that may tend to occur in the cables 22. For this purpose each block bearing 26 may be provided with a longitudinally extending rod 28 slidably received in a sleeve 29 that is threadedly supported in a block 30 fixed to the side of the frame members 10 and 11. The sleeves 29 may each be provided with a hexagonal head 29a by which the sleeves may be rotated and their position thus changed longitudinally within their respective blocks 30. A compression spring 31 is disposed about each shaft 28 between each block bearing 26 and each shoulder 29a on the sleeves 29, with the result that the block bearings 26 and the idler shaft 25 are urged to the left, as viewed in Fig. 1, to maintain a high state of tension in the cables 22.

The transverse rods 18 in the load-bearing flight 20 of the conveyor belt rest freely upon and are supported by the upper strands of the taut cables 22. In this manner the entire load-bearing flight of the conveyor is supported intermediate the ends of the conveyor, the dead weight loads carried by the load-flight 20 being absorbed by the cables 22. When the conveyor is to carry particularly heavy loads, or when the load-bearing flight 20 of the conveyor is of considerable length, the upper strands of the cables 22 may be suported at intermediate points by means of support pulleys 32 mounted upon idler shafts 33 (Fig. 1) which are journaled at their opposite ends in the frame members 10 and 11. If desired, the return flight of a conveyor belt, which of course is not subjected to dead weight loads, may also be supported intermediate the ends of the conveyor by means of slotted sprockets 34 mounted upon another idler shaft 35 also journaled at its opposite ends in the side members 10 and 11.

As will best be seen in Fig. 2, the inner diameter of each cable drive pulley 23, measured from its axis to the bottom of its cable receiving groove 23a, is substantially equal to the inner diameter of each conveyor driving sprocket 16 as measured from the axis of each sprocket 16 to the base or bottom of its rod receiving slots 17. It will therefore be apparent that when rotative power is applied to the pulley 14 on the shaft 12, both the conveyor belt and the taut cables 22 will be driven lineally in the same direction and at substantially the same speed. Because both the conveyor belt and its support move at substantially the same speed, there is no appreciable friction between the rods 18 of the conveyor belt and the conveyor belt supporting cables 22 regardless of the weight carried by the load-bearing flight 20 of the conveyor belt. Any slight difference that may occur between the lineal speed of the conveyor belt and the supporting cables 22 is automatically taken up by a resultant rotation of the transverse rods 18 in their connecting links 19. This slight rotation of the rods is advantageous in many installations because it tends to keep the rods clean and avoids any tendency toward discolorization of the rods at points of contact between the rods and cables.

In order to render the conveyor more silent in operation and in order to increase the sanitary ntaure of its construction, the links 19 may be fabricated from sheet nylon or other plastic. Such links are easy to clean and do not require lubrication, thus having substantially no tendency to collect dirt. The taut cables 22, furthermore, may be of the plastic coated or plastic covered type which have the advantage that they add further to silent operation, are easy to clean, and also have little or no tendency to collect dirt.

In connection with the sanitary character of the present conveyor it will be noted that there are no flat surfaces of any appreciable size located between the two longitudinal frame members 10 and 11, the only flat surfaces involved being the top surfaces of the links 19 which of course are of very small area. As a result, there is no part of the conveyor that has any tendency to collect dust or crumbs or the like. Any dirt, waste material, crumbs or other particles that may fall off of the things carried by the load-flight of the conveyor will simply fall downwardly between the rods 18, or between the ends of the rods and the frame members 10 and 11, to the floor where it may be swept up from time to time. None of this material will lodge upon or be collected upon the conveyor itself. Furthermore, the open construction of all parts of the conveyor is such that the conveyor may easily be inspected and quickly cleaned and sterilized when desired.

The rods 18 of the conveyor belt are easily replaceable by virtue of the link construction by which the rods are interconnected. In order to "open" the conveyor belt for replacement of a rod 18, or if disassembly of the conveyor belt is desired for any reason, a pair of adjacent rods joined by any pair of links 19d are first grasped and moved toward each other to the position shown in Fig. 6, wherein the extremity 18b of one of the rods is in alignment with the enlargements 19c in the slots 19a of the side-by-side pair of links 19d. With the rods 18 held in this position, the left end of the outer link 19d (as viewed in Fig. 6) is pulled forwardly over the extremity 18b of the aligned rod to free the link from that particular rod. The outer link is then moved longitudinally to bring the enlargement 19c therein into alignment with the extremity of the second rod, whereupon the link is lifted free of the conveyor. The rods are then parted slightly to align the right-hand rod (again as seen in Fig. 6) with the enlargement 19c of the right-hand flight-link 19e, permitting the latter link to be lifted free of the right-hand rod, thereby separating one side of the conveyor belt. The opposite side of the conveyor belt is separated in a like manner and the links at the free end of the "opened" conveyor belt are thereafter removed from the rods merely by relative movement of the rods and links to bring the ends of the rods into alignment with the enlargements 19c of the openings or slots 19a in the links. The conveyor belt is of course assembled by reversing the procedure stated above.

It will be noted that in the first step in disassembling or "opening" the conveyor belt, that is, in first moving a pair of rods 18 toward each other to bring one of the rods into alignment with the enlargements 19c in a side-by-side pair of links 19d, as illustrated in Fig. 6, this movement of the rods pulls the adjacent flight links 19e toward each other. Inasmuch as the ends of these flight links 19e will contact each other and thereby limit the extent to which the rods may be moved, the positioning of the enlargement 19c in the slots 19a of the links is very important. As will be verified by consideration of Figs. 5 and 6, the geometric center of the enlargement 19c in each slot must be located from one end of the slot a distance X (Fig. 5) which is not less than one and one-half times the diameter of the rods 18 plus the sum of the longitudinal wall thicknesses of the opposed ends of the next adjacent links. These longitudinal wall thicknesses are represented in Fig. 5 by the letters Y and Z. If the distance X were any less than that just stated, abutment of the ends of the adjacent flight links 19e would prevent initial movement of a rod 18 to a position in alignment with the enlargement 19c of a slot 19a in any link. The disposition of the enlargement 19c in the slots 19a of links therefore plays an important part in the ease with which the present conveyor may be assembled and disassembled.

The foregoing description has been given for clearness of understanding only and no unnecessary limitations should be inferred therefrom, for it will be apparent to those skilled in the art that many variations and modifications may be made in the structure without departing from the spirit and scope of the appended claims. Although it has been stated that the present conveyor is of particular utility in bakeries and food processing plants, it will also be understood that the conveyor may find wide application in other industries where its features of sanitation, minimum friction, silent operation and ease of assembly and disassembly will be of importance and value.

We claim:

1. A conveyor comprising, a plurality of substantially evenly spaced, transverse, parallel rods, cylindrical bearing portions of reduced diameter formed on each rod adjacent the opposite ends thereof, a plurality of links interconnecting the bearing portions of adjacent rods to form a conveyor belt, each of said links having a single elongated slot therein slidably and rotatably containing the bearing portions of an adjacent pair of said rods and having a single enlargement therein through which the end extremities of said pair of rods may be passed one at a time to permit easy assembly and disassembly of said conveyor belt, a taut cable beneath said conveyor belt supportingly engaging said rods intermediate the respective ends thereof, and means of simultaneously driving said conveyor belt and said cable lineally in the same direction and at substantially the same speed.

2. A conveyor comprising, a plurality of substantially evenly spaced, parallel cylindrical rods, cylindrical bearing portions on each rod adjacent the opposite ends thereof, said bearing portions having a diameter less than the diameter of the extremities of the ends of said rods, a plurality of links interconnecting the bearing portions of adjacent rods to form a conveyor belt, each of said links having a single elongated slot therein slidably and rotatably containing the bearing portions of an adjacent pair of said rods and having a single enlargement therein through which the end extremities of said pair of rods may be passed to permit easy assembly and disassembly of said belt, movable support means engaging said rods intermediate the interconnecting links thereon, and means for simultaneously driving said conveyor belt and said support means lineally in the same direction at substantially the same speed.

3. A conveyor comprising, a plurality of substantially evenly spaced, parallel cylindrical rods, cylindrical bearing portions on each rod adjacent the opposite ends thereof, said bearing portions having a diameter less than the diameter of the extremities of the ends of said rods, a plurality of links interconnecting the bearing portions of adjacent rods to form an endless conveyor belt having a load flight and a return flight, each of said links having a single elongated slot therein slidably and rotatably containing the bearing portions of an adjacent pair of said rods and having an enlargement therein through which said end extremities of said pair of rods may be passed to permit easy assembly and disassembly of said belt, a pair of suspended taut traveling cables in supporting position beneath said load bearing flight, said load-bearing flight intermediate the ends of said conveyor belt being supported solely by said traveling cables, resilient means for maintaining the tension in said cables, and means for simultaneously driving said conveyor belt and said support cables lineally in the same direction and at substantially the same speed.

4. A conveyor comprising, a plurality of transverse unitary rods having cylindrical bearing portions formed thereon adjacent the opposite ends of the rods, said bearing portions having a diameter less than the diameter of the extremities of the ends of said rods, a plurality of links interconnecting the bearing portions of adjacent rods to form a conveyor belt, each of said links having a single elongated slot therein slidably and rotatably containing the bearing portions of an adjacent pair of said rods and having an enlargement therein corresponding to the diameter of the extremities of said pair of rods through which said extremities may be freely passed one at a time to permit easy assembly and disassembly of said belt, the geometric center of said enlargement being located from one end of said slot a distance not less than one and one-half times the diameter of said rods plus the sum of the longitudinal wall thicknesses of the opposed ends of the next adjacent links to permit unobstructed longitudinal movement of said pair of rods to position in alignment with said enlargement.

5. A conveyor comprising, a plurality of transverse, unitary rods having cylindrical bearing portions formed thereon adjacent the opposite ends of the rods, said bearing portions having a diameter less than the diameter of the extremities of the ends of said rods, a plurality of links interconnecting the bearing portions of adjacent rods to form a conveyor belt, each of said links having a single elongated slot therein slidably and rotatably containing the bearing portions of an adjacent pair of said rods and having a single enlargement therein corresponding to the diameter of the extremities of said pair of rods through which said extremities may be freely passed one at a time to permit easy assembly and disassembly of said belt, the geometric center of said enlargement being located from one end of said slot a distance not less than one and one-half times the diameter of said rods plus the sum of the longitudinal wall thicknesses of the opposed ends of the next adjacent links to permit unobstructed longitudinal movement of said pair of rods to position in alignment with said enlargement, movable support means engaging said rods intermediate the interconnecting links thereon, and means for simultaneously driving said conveyor belt and said support means lineally in the same direction at substantially the same speed.

References Cited in the file of this patent

UNITED STATES PATENTS

| | | |
|---|---|---|
| 1,111,823 | Coldren | Sept. 29, 1914 |
| 1,314,270 | Kendall | Aug. 26, 1919 |
| 1,374,874 | Bassler | Apr. 12, 1921 |
| 1,468,804 | Contant | Sept. 25, 1923 |
| 1,677,656 | Roberts et al. | July 17, 1928 |